United States Patent
Sako et al.

(10) Patent No.: US 7,594,123 B2
(45) Date of Patent: Sep. 22, 2009

(54) DATA RECORDING APPARATUS AND METHOD AND DATA REPRODUCING APPARATUS AND METHOD

(75) Inventors: Yoichiro Sako, Tokyo (JP); Tatsuya Inokuchi, Tokyo (JP); Shunsuke Furukawa, Tokyo (JP)

(73) Assignee: Sony Corporation (JP)

( * ) Notice: Subject to any disclaimer, the term of this patent is extended or adjusted under 35 U.S.C. 154(b) by 406 days.

(21) Appl. No.: 10/380,733

(22) PCT Filed: Jul. 15, 2002

(86) PCT No.: PCT/JP02/07164

§ 371 (c)(1),
(2), (4) Date: Mar. 17, 2003

(87) PCT Pub. No.: WO03/012786

PCT Pub. Date: Feb. 13, 2003

(65) Prior Publication Data

US 2004/0039907 A1 Feb. 26, 2004

(51) Int. Cl.
*G06F 11/30* (2006.01)
*G06F 11/14* (2006.01)

(52) U.S. Cl. .................. 713/193; 713/22; 711/163; 365/51

(58) Field of Classification Search .............. 713/193, 713/22; 711/163; 365/51
See application file for complete search history.

(56) References Cited

U.S. PATENT DOCUMENTS

| 6,832,319 | B1 * | 12/2004 | Bell et al. ............... 713/193 |
| 6,859,535 | B1 * | 2/2005 | Tatebayashi et al. ...... 380/201 |
| 2002/0001385 | A1 * | 1/2002 | Kawada et al. ........... 380/201 |
| 2002/0016919 | A1 * | 2/2002 | Sims, III ................. 713/193 |

FOREIGN PATENT DOCUMENTS

| JP | 288762 A | 10/1995 |
| JP | 283270 A | 10/1998 |
| JP | 187935 A | 7/2000 |
| JP | 77802 A | 3/2001 |
| WO | 00/22777 A | 4/2000 |

\* cited by examiner

*Primary Examiner*—Kambiz Zand
*Assistant Examiner*—Farid Homayounmehr
(74) *Attorney, Agent, or Firm*—Lerner, David, Littenberg, Krumholz & Mentlik, LLP

(57) ABSTRACT

A recording method for a recording medium, wherein an encrypting process is executed to inputted contents data by using either key data, which becomes key data only for use of the recording medium by being recorded, or by using fixed value data. When an encoding process is executed to the encryption-processed data, if the key data which becomes the key data only for use of the recording medium by being recorded, is used at the time of the encrypting process, that key data is embedded, and the encoding-processed data is recorded onto the recording medium.

13 Claims, 3 Drawing Sheets

DATA RECORDING APPARATUS AND METHOD AND DATA REPRODUCING APPARATUS AND METHOD

TECHNICAL FIELD

The invention relates to data recording apparatus and method and data reproducing apparatus and method, in which security is held by encryption.

BACKGROUND ART

In recent years, contents obtained by compressing digital data of what is called a CD (Compact Disc) on which music information has been recorded by MP3 (MPEG (Moving Picture Experts Group)-1 Audio Layer III) is distributed via the Internet, data read out from the CD is copied onto a CD-R (CD-Recordable) disc, and an exchange service of a music file of a peer-to-peer type which is provided by Napster Co., Ltd. in U.S.A. has been spread, so that a problem of protection of a copyright (hereinbelow, properly referred to as security) has been largely highlighted. Therefore, in novel media which have been proposed in recent years, for example, in recording media such as SACD (Super Audio CD), DVD (Digital Versatile Disc or Digital Video Disc) audio, memory card, etc., the security is held by encrypting the contents. For example, the memory card uses a flash memory and is detachable from an apparatus. When encrypted music data is recorded and stored into the memory card, the apparatus is authenticated and only when the authentication is satisfied, that is, when the apparatus is correctly authenticated, the encrypted data can be stored and recorded into the memory card.

A small optical disc (diameter is equal to 32 mm) proposed by DataPlay Co., Ltd. in U.S.A. uses a copyright protecting technique. Such a technique is constructed by encryption and a technique for controlling reproducing conditions of contents. An "encryption key" to decrypt the encryption performed to the contents and a "condition access key" which specifies access conditions by the user are stored in a dedicated area of a disc inner rim portion which can be accessed only by a copyright protection system.

There is a method whereby information that is indispensable to form key information is recorded into a read only memory area (ROM portion) instead of the key information itself to decrypt the encryption performed to contents data. For example, as an illegal copy preventing technique of a DVD, there has been proposed a technique such that media ID data is recorded in the read only memory area (ROM portion) of an innermost rim portion of a rewritable DVD and contents encrypted by using a hash value of the media ID data and an MKB (Media Key Block) as key data is recorded onto the disc. The media ID data is a value which differs every disc and cannot be rewritten by the user. Thus, even if a data portion is illegally copied onto another disc, since the media ID data differs from media ID data of the disc serving as a copy source, the data portion which was illegally copied cannot be decrypted.

To use the novel media to which the countermeasure for the copyright protection has been made as mentioned above, it is necessary to purchase a new recorder/player. Since it newly causes an economical burden on the user, it becomes an obstacle to widespread the novel media. Even if it is intended to take the countermeasure for the copyright protection to the existing recorders/players, a problem of compatibility is caused or there is a problem such that if it is intended to decrypt the encryption by software installed in a personal computer in order to realize the compatibility, the copyright cannot be sufficiently protected.

It is, therefore, an object of the invention to provide data recording apparatus and method and data reproducing apparatus and method, in which a full-scale security function for encrypting by using a key bound to a media can be easily introduced.

DISCLOSURE OF INVENTION

To accomplish the above object, according an aspect of the present invention, there is provided a recording apparatus for a recording medium comprising:

an encryption processing unit for executing an encrypting process to inputted contents data by using either key data which becomes key data only for use of the recording medium by being recorded or fixed value data;

an encoding processing unit for executing an encoding process to output data from the encryption processing unit and embedding the key data which becomes the key data only for use of the recording medium by being recorded when the key data which becomes the key data only for use of the recording medium by being recorded is used by the encryption processing unit; and a recording unit for recording output data from the encoding processing unit onto the recording medium.

According to another aspect of the present invention, there is provided a recording method for a recording medium, comprising the steps of:

executing an encrypting process to inputted contents data by using either key data which becomes key data only for use of the recording medium by being recorded or fixed value data;

when an encoding process is executed to the encryption-processed data, embedding the key data which becomes the key data only for use of the recording medium by being recorded when the key data which becomes the key data only for use of the recording medium by being recorded is used at the time of the encrypting process; and recording the encoding-processed data onto the recording medium.

According to yet another aspect of the present invention, there is provided a reproducing apparatus for a recording medium, comprising:

a head unit for reading out data from the recording medium on which contents data has been encrypted and recorded;

a decoder for executing a decoding process to a signal from the head unit; and a decryption processing unit for decrypting the encryption performed to output data from the decoder by using either key data which has been read out from the recording medium and becomes the key data only for use of the recording medium by being recorded onto the recording medium or fixed value data.

According to yet another aspect of the present invention, there is provided a reproducing method for a recording medium, comprising the steps of:

reading out identification data from the recording medium on which contents data has been encrypted by using either key data which becomes key data only for use of the recording medium by being recorded or fixed value data and recorded and identification data showing whether the recording medium is a recording medium in which the contents data has been encryption-processed by using either the key data which becomes the key data only for use of the recording medium by being recorded or the fixed value data or not has been recorded;

if it is determined by the read-out identification data that the contents data has been encryption-processed by the fixed value data, executing a decrypting process of the encryption of data read out from the recording medium by the fixed value data; and if it is determined by the read-out identification data that the contents data has been encrypted by the key data which becomes the key data only for use of the recording medium by being recorded, executing the decrypting process of the encryption of the contents data read out from the recording medium by using the key data which has been read out from the recording medium and becomes the key data only for use of the recording medium by being recorded.

According to yet another aspect of the present invention, there is provided a recording medium comprising:

a data area in which encrypted contents data is recorded; and a management data area which is provided in a position where it is read out prior to the data area and in which data including management data of the data area and identification data showing whether the recording medium is a recording medium in which the contents data has been encryption-processed by using either key data which becomes key data only for use of the recording medium by being recorded or fixed value data or not is recorded.

BEST MODE FOR CARRYING OUT THE INVENTION

Figure 1:
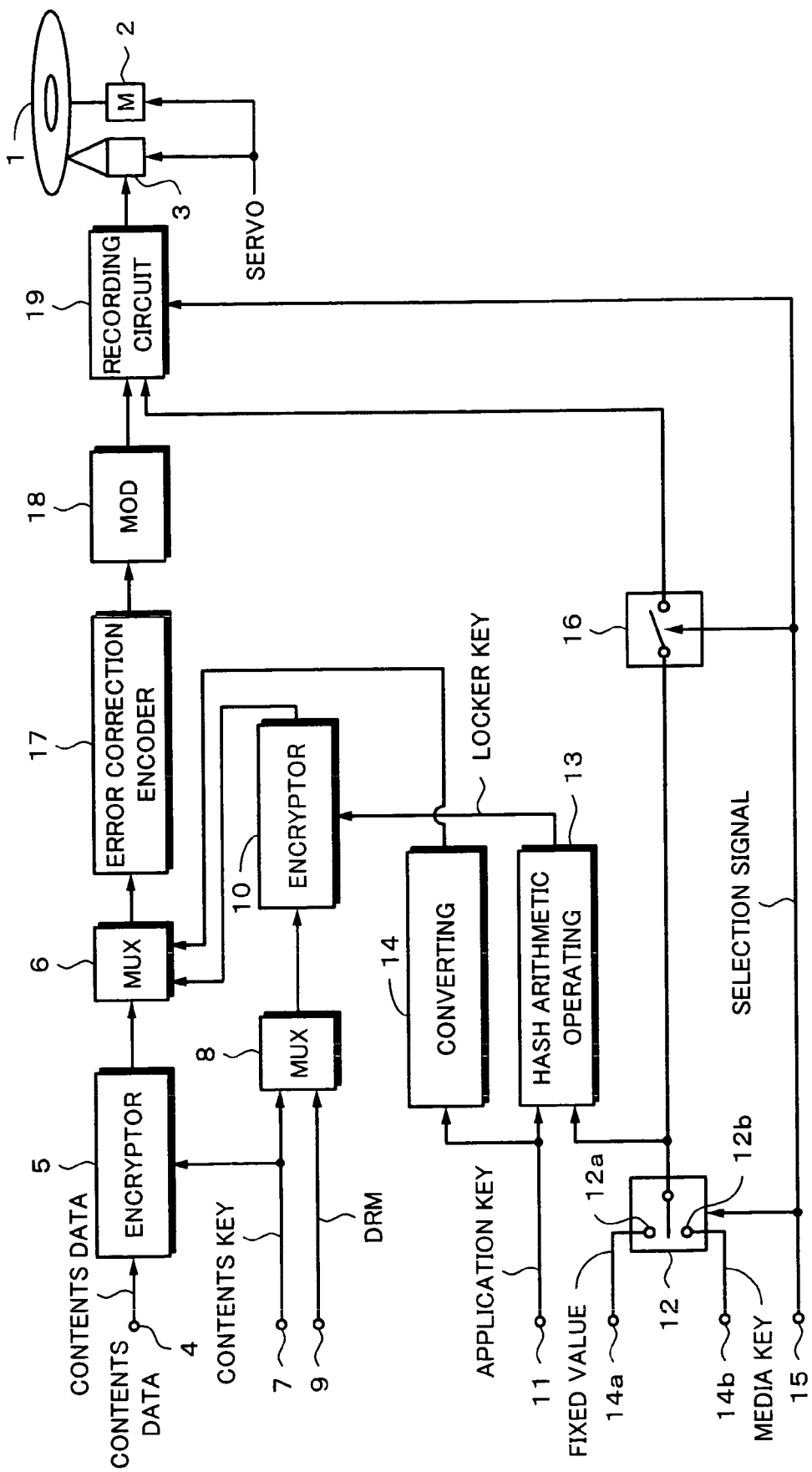
FIG. 1 is a block diagram showing an example of a construction of a recording apparatus according to an embodiment of the invention.

An embodiment of the invention will be described hereinbelow. The embodiment shows an example in which the invention is applied to an optical disc as a recording medium. An example of a recording apparatus will be described with reference to FIG. 1. In FIG. 1, reference numeral 1 denotes an optical disc, for example, a recordable optical disc similar to a CD-RW disc or a CD-R disc. It is specified that all contents data which is recorded onto the optical disc 1 is encrypted. Therefore, recording or reproduction using the optical disc 1 cannot be performed by an existing optical disc recording and/or reproducing apparatus which does not execute encryption.

The recording apparatus shown in FIG. 1 and a reproducing apparatus (FIG. 2), which will be explained hereinlater, do not need to be dedicated hardware as shown in the diagrams but can be also realized by a personal computer and software. Particularly, in this case, encrypting and decrypting processes regarding security are realized by the software.

The optical disc 1 is rotated at a constant linear velocity or a constant angular velocity by a spindle motor 2. In the recording apparatus shown in FIG. 1, an optical pickup 3 is provided to record data onto the optical disc 1 and read out the data recorded on the optical disc 1. The optical pickup 3 is moved in the radial direction of the optical disc 1 by a feed motor (not shown).

The optical disc 1 in the embodiment is a phase change type disc as a rewritable optical disc such that data can be recorded by irradiating a laser beam of an output level which is necessary for recording and the data can be reproduced by detecting a change in light amount of the laser beam reflected by the optical disc 1. A substrate on which a recording film made of a phase change recording material is coated is formed by, for example, injection molding polycarbonate. A track guide groove called a groove has previously been formed on one surface of the substrate. The groove which is formed on one surface of the disc substrate is also called a pregroove in terms of a meaning such that it is preliminarily formed. A portion between the grooves is called a land. It is usually defined in a manner such that a front side when it is seen from an incident side of the read laser beam corresponds to the land and a remote side corresponds to the groove. The groove is spirally continuously formed from the inner rim to the-outer rim. The invention is not limited the phase change type optical disc but can be also applied to a magnetooptic disc and a write-once type disc using organic pigment as a recording material so long as it can be recorded.

The groove is woven (called wobbled) in the radial direction of the optical disc so as to be used as a reference signal which is used for rotation control of the optical disc 1 and used upon recording. Data is recorded in the groove or to both of the groove and the land. Further, as wobble information of the groove, absolute time information as address information is continuously recorded. In other words, the groove is woven, that is, wobbled in the radial direction of the optical disc 1 on the basis of address information. In the CD-R disc and the CD-RW disc, a desired writing position on the optical disc 1 is searched with reference to the absolute time information as address information which is obtained by detecting the wobbling groove, the optical pickup 3 is moved in the radial direction of the optical disc 1, and the laser beam is irradiated onto the optical disc 1 from the optical pickup 3, thereby writing data onto the disc.

Such an optical disc having the wobbling groove is manufactured as follows. A mastering apparatus irradiates the laser beam onto a photoresist film coated onto a disc-shaped glass mother disc and deflects the laser beam in the radial direction or swings it in the radial direction, thereby forming a latent image of the wobbling groove having address information, clock information, or the like onto the photoresist film. The disc-shaped mother disc is formed by developing the photoresist film exposed by the irradiation of the laser beam. A stamper is formed from the disc-shaped mother disc by an electroforming process. By performing injection molding by using the formed stamper, the disc substrate having the wobbling groove mentioned above is molded. A recordable optical disc is formed by adhering an optical recording material such as a recording material of a phase change type or the like onto the surface of the disc substrate formed with the groove by using a sputtering method or the like.

Returning to FIG. 1, contents data to be recorded, for example, audio and/or video data is supplied from an input terminal 4 to an encryptor 5. The contents data encrypted by the encryptor 5 is supplied to a multiplexer 6. The encryptor 5 encrypts the inputted data into the contents data by using contents key data from an input terminal 7. The contents key data inputted from the input terminal 7 is also supplied to a multiplexer 8.

Management information (expressed as DRM (Digital Rights Management) data) to instruct or specify the multiplexer 8 how to handle the contents is supplied from an input terminal 9. For example, information indicative of permission/inhibition of a copy and information of management of a copy generation are included in the DRM. Output data of the multiplexer 8 is encrypted by an encryptor 10. The encryptor 10 is used to encrypt the contents key data and the DRM data. The encrypted contents key data and DRM data which are outputted from the encryptor 10 are supplied to the multiplexer 6.

Locker key data is supplied to the encryptor 10. The contents key data and the DRM data are encrypted by the locker key data. A hash value of application key data from an input terminal 11 and data selected by a selector 12 is arithmetically operated in a hash arithmetic operating unit 13. This hash value is the locker key data. An application key denotes a key which is not bound to a media, that is, the optical disc 1 in the invention, and it is held by software or held by a device. The application key data is subjected to a data converting process such as a scrambling process in a converting unit 14 and supplied to the multiplexer 6.

Key data bound to the media, that is, the optical disc 1 denotes data which becomes key data only for use of the media by being recorded into the media. The key data bound to the media has been embedded in the media so that it cannot be read out when the media is reproduced by the existing recording and/or reproducing apparatus in which a countermeasure by encryption for the security is not taken. The key data bound to the media can be read out by a novel recording and/or reproducing apparatus in which a countermeasure for the security is taken. Specifically speaking, key data expressed by deformation of a pit itself or displacement (wobbling) of the pit, key data expressed by using coupling bits (3 bits) in EFM modulation, ID data that has been recorded in a disc innermost rim area and is peculiar to a disc, or the like is the key data bound to the media. The novel recording and/or reproducing apparatus extracts the key data bound to the media from the data read out from the media and can decode the contents data encrypted by the extracted key data. However, in general, a countermeasure for disabling the key data itself to be recognized from the outside is taken in the novel recording and/or reproducing apparatus, so that a media in which the encrypted contents data and key data are illegally copied cannot be formed.

The selector 12 has a first input terminal 12a, a second input terminal 12b, and an output terminal. Fixed value data is supplied to an input terminal 14a connected to the input terminal 12a of the selector 12. Media key data is supplied to an input terminal 14b connected to the input terminal 12b of the selector 12. The selector 12 is controlled by, for example, a selection signal which is formed on the basis of software for controlling the operation of the whole recording apparatus shown in FIG. 1 and supplied to an input terminal 15. One of the media key data and the fixed value data selected by the selector 12 is supplied to the hash arithmetic operating unit 13 and a gate 16.

An optical disc in which the fixed value that is inputted from the input terminal 14a is selected by the selector 12 and data is recorded, that is, an optical disc which is not bound to the media is properly called a disc of a type A. An optical disc in which the media key data that is inputted from the input terminal 12b is selected by the selector 12 and data is recorded, that is, an optical disc bound to the media is properly called a disc of a type B. The encrypted contents data is recorded in both of the disc of the type A and the disc of the type B.

The software to control the operation of the whole recording apparatus shown in FIG. 1 is distributed from a recording medium such as a CD-ROM or the like or via a network such as Internet or the like. For example, at a stage where the novel recording and/or reproducing apparatus which can reproduce the disc of the type B in which the media key data has been recorded is not sufficiently spread yet, for example, a controller (not shown) forms the selection signal to control the selector 12 so as to select the fixed value on the basis of the software and outputs it. After that, at a stage where the novel recording and/or reproducing apparatus has sufficiently been spread, software to generate the selection signal to control the selector 12 so as to select the media key data is distributed. The selection signal can be also generated in accordance with to which one of the disc of the type A and the disc of the type B the recording and/or reproducing apparatus possessed by the user corresponds. In this case, for example, in the recording apparatus shown in FIG. 1 according to the invention, the controller (not shown) generates the selection signal according to to which one of the disc of the type A and the disc of the type B the recording apparatus itself corresponds.

The disc of the type A encrypted by using the fixed value data cannot be reproduced by the existing recording/reproducing apparatus or reproducing apparatus. However, if the apparatus is modified by adding a decryptor for decrypting the encryption by using the fixed value data to the existing apparatus, the disc of the type A can be reproduced. Since there is no need to add a construction which is necessary for processes such as reading of the media key data, creation of the locker key data and the contents key data, and the like, a construction of a relatively low cost can be realized. Further, in the case where the decryption of the encryption performed to the contents data is executed by a software process, the disc of the type A is reproduced by the existing reproducing apparatus or recording/reproducing apparatus and the encryption of the data read out from the disc of the type A can be decrypted by using the fixed value. In this case, the disc of the type A can be reproduced with hardly modifying the hardware of the existing reproducing apparatus or recording/reproducing apparatus.

The media key data denotes key data bound to the foregoing media (optical disc 1 here). On the other hand, the fixed value data denotes a value which is not bound to the media. For example, data of all "1", data of all "0", or data of a known pattern such as "101010 . . . 10" is the fixed value data. Further, specific data recorded in a specific address of a lead-in area on the innermost rim side of the optical disc 1 can be also used as fixed value data. The lead-in area functions as a data area where the encrypted contents data or the like is recorded and as a management data area where TOC data serving as management data of the data recorded in the data area is recorded, and is read out prior to the data area. For example, program start time, data indicative of the number of music pieces, data of a total play time of the disc, and the like in the TOC (Table Of Contents) data can be used. Although the media key data is certainly recorded onto the optical disc 1, there is no need to record the known fixed value data onto the optical disc 1 upon reproduction of the optical disc 1 for the reproducing apparatus or recording/reproducing apparatus. In the case where the predetermined data in the TOC data mentioned above is used as fixed value data, since the TOC data itself is recorded by, for example, the recording apparatus shown in FIG. 1, there is no need to especially record the fixed value data. The TOC data includes type ID data showing whether the optical disc 1 is the disc of the type A or the disc of the type B.

When the media key data is recorded onto the optical disc 1, the gate 16 is controlled by the selection signal which is supplied from the input terminal 15 so as to be turned on when the selector 12 selects the media key data. When the selector 12 selects the fixed value data, the gate 16 is turned off by the selection signal. When the media key data is recorded, the media key data outputted from the selector 12 is supplied to a recording circuit 19 via the gate 16.

The multiplexer 6 converts the encrypted contents data, the encrypted contents key data and DRM data, and the converted application key data into a predetermined format. Output data of the multiplexer 6 is supplied to an error correction encoder 17. The output data from the multiplexer 6 is subjected to an error correction encoding process by the error correction encoder 17. Output data of the error correction encoder 17 is modulated by a modulating unit 18. For example, an EFM modulating process is executed by the modulating unit 18. Output data of the modulating unit 18 is supplied to the recording circuit 19.

The media key data which is outputted via the gate 16 and the selection signal to control the selector 12 are supplied to the recording circuit 19. In the recording circuit 19, a process for adding a frame sync signal, address information, etc. is executed and the media key data and the selection signal are converted into recording data, respectively. For example, the media key data is recorded onto the optical disc 1 by using coupling bits (3 bits) in the EFM modulation. In this case, the media key data can be also supplied to the modulating unit 18. A type identifier formed on the basis of the selection signal is recorded as data of a part of the TOC data in the lead-in area. Further, a laser driving circuit of the recording circuit 19 forms a driving signal having a predetermined level for recording the recording data onto the optical disc 1. The driving signal of the laser driving circuit is supplied to a semiconductor laser of the optical pickup 3. The laser beam modulated on the basis of the driving signal supplied from the semiconductor laser is irradiated onto the optical disc 1, so that the data is recorded.

Figure 2:
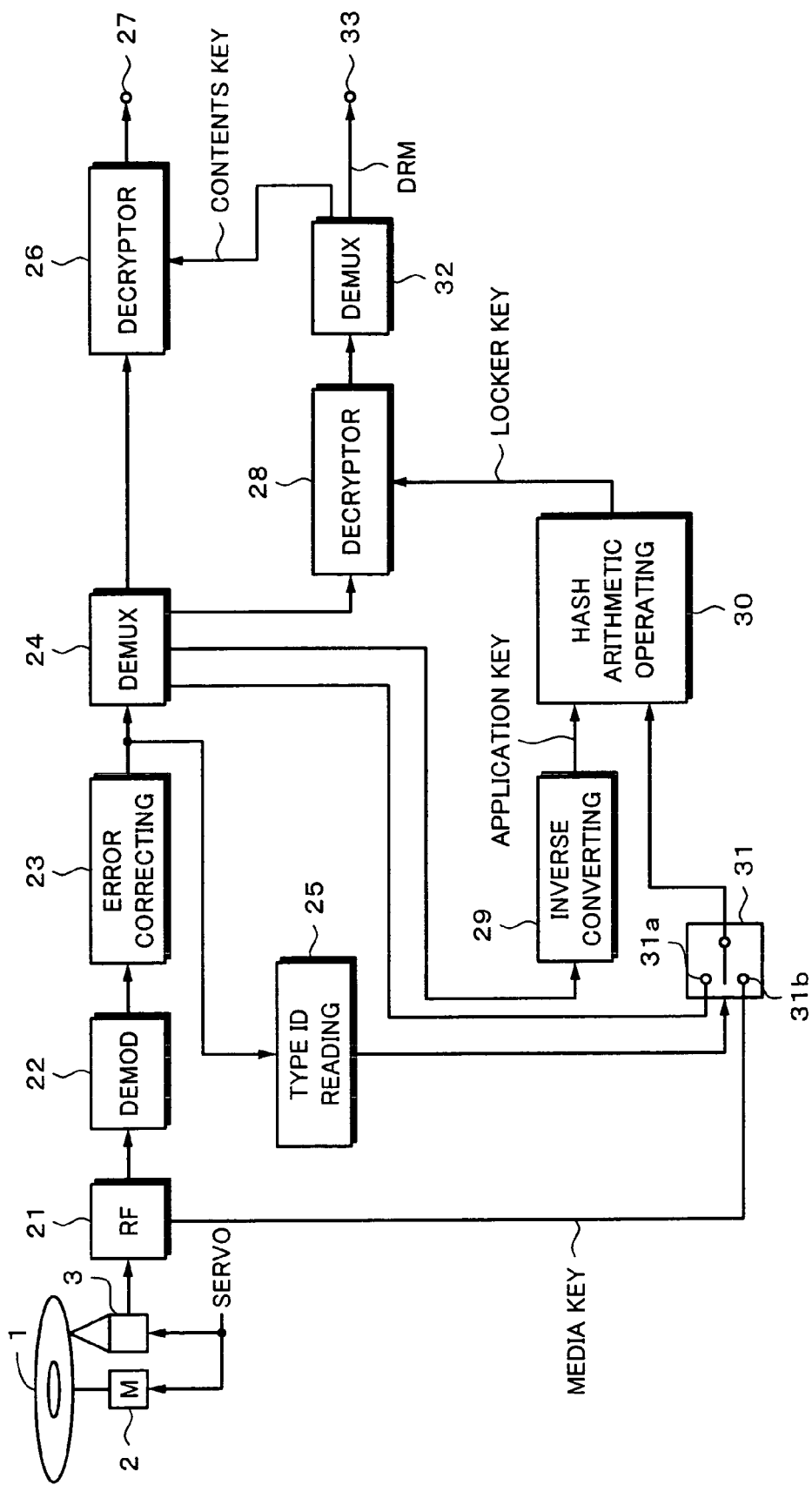
FIG. 2 is a block diagram showing an example of a construction of a reproducing apparatus in the embodiment of the invention.

FIG. 2 shows an example of a construction of a reproducing system which corresponds to the recording system in FIG. 1 and to which the invention is applied. The laser beam having an output level necessary for reproduction is irradiated from the optical pickup 3 to the optical disc 1. The laser beam reflected by the optical disc 1 is detected by a 4-split photodetector provided for the optical pickup 3. A signal detected as an output signal from the photodetector is supplied to an RF processing block 21. In the RF processing block 21, a matrix amplifier arithmetically operates the output signal of the photodetector, thereby forming a reproduction (RF) signal, a tracking error signal, and a focusing error signal. If the clock signal and the address information have been recorded as a wobbling groove, a signal obtained by detecting the wobbling groove is outputted from the RF processing block 21. In a manner similar to the recording system, the reproducing system is also not limited to the apparatus as shown in FIG. 1 or 2, that is, the dedicated hardware but can be realized by a personal computer and software.

The RF signal is supplied to a demodulating unit 22 and, for example, EFM demodulation is executed. Output data of the demodulating unit 22 is supplied to an error correcting circuit 23 and error detecting and error correcting processes are executed. An output signal of the error correcting circuit 23 is supplied to a demultiplexer 24 and a type ID (identifier) reading unit 25. The tracking error signal and the focusing error signal are supplied from the RF processing block 21 to a servo circuit (not shown). Rotation of the spindle motor 2 and tracking control and focusing control of the optical pickup 3 are executed. The servo circuit executes a tracking servo and a focusing servo for the optical pickup 3, a spindle servo for the spindle motor 2, and a sled servo to control the movement of the optical pickup 3 to the optical disc 1. By demodulating a wobbling signal, the address information is extracted. This address information is called ATIP (Absolute Time In Pregroove) and indicates an absolute address on the disc by time information. The address information is supplied to a system controller (not shown) of the reproducing apparatus shown in FIG. 2 and used for reading information in a desired address on the optical disc 1.

The demultiplexer 24 separates the encrypted contents data, the encrypted contents key data and DRM data, and the converted application key data and outputs them. The encrypted contents data is supplied to a decryptor 26 for decrypting the encryption. The encrypted contents data is decrypted by the decryptor 26. The contents data reproduced from the optical disc 1 and decrypted, that is, the contents data whose encryption has been decrypted is taken out to an output terminal 27.

The encrypted contents key data and DRM data separated by the demultiplexer 24 is supplied to a decryptor 28. The converted application key data is supplied to an inverse converting unit 29. The inverse converting unit 29 executes a process opposite to the converting process performed in the converting unit 14 of the recording system (refer to FIG. 1). For example, if a scrambling process is executed to the application key data in the recording system, a descrambling process is executed to the application key data in the inverse converting unit 29. The application key data which is outputted from the inverse converting unit 29 is supplied to a hash arithmetic operating unit 30.

Output data of a selector 31 is also supplied to the hash arithmetic operating unit 30. The fixed value data which is outputted from the demultiplexer 24 is supplied to one input terminal 31a of the selector 31. The media key data separated by the RF processing block 21 is supplied to the other input terminal 31b. The fixed value data is, for example, specific data recorded in a part of the TOC data. The demultiplexer 24 separates the fixed value data and outputs it. It is also possible that the demultiplexer 24 generates the fixed value data and the generated the fixed value data is outputted.

The media key data is key data bound to the optical disc 1 (type B) and has secretly recorded on the optical disc 1 so that it can be hardly recognized from the outside. If the optical disc 1 is a disc of the type A, the media key data is not recorded. The selector 31 is controlled by the type ID data which is outputted from the type ID reading unit 25.

The type ID data is, for example, recorded as data of a part of the TOC data in the innermost rim portion of the optical disc 1 as mentioned above. When the optical disc 1 is loaded into the reproducing apparatus shown in FIG. 2, first, the data information in the area where the TOC data has been recorded is read out. If the type ID data indicates the disc of the type A, the input terminal 31a is selected and the fixed value data from the demultiplexer 24 is supplied to the hash arithmetic operating unit 30. If the type ID data indicates the disc of the type B, the input terminal 31b is selected and the media key data from the RF processing block 21 is supplied to the hash arithmetic operating unit 30. A hash value of the output data from the selector 31 and the application key data is obtained by the hash arithmetic operating unit 30. The hash value obtained by the hash arithmetic operating unit 30 is the locker key data.

The locker key data from the hash arithmetic operating unit 30 is supplied to the decryptor 28. The encryption performed to the contents key data and the DRM data is decrypted by the decryptor 28. A demultiplexer 32 connected to the decryptor 28 separates the contents key data and the DRM data and outputs them. The contents key data is supplied to the decryptor 26 mentioned above and the encryption of the encrypted contents data is decrypted. The DRM data is taken out to an output terminal 33.

Figure 3:
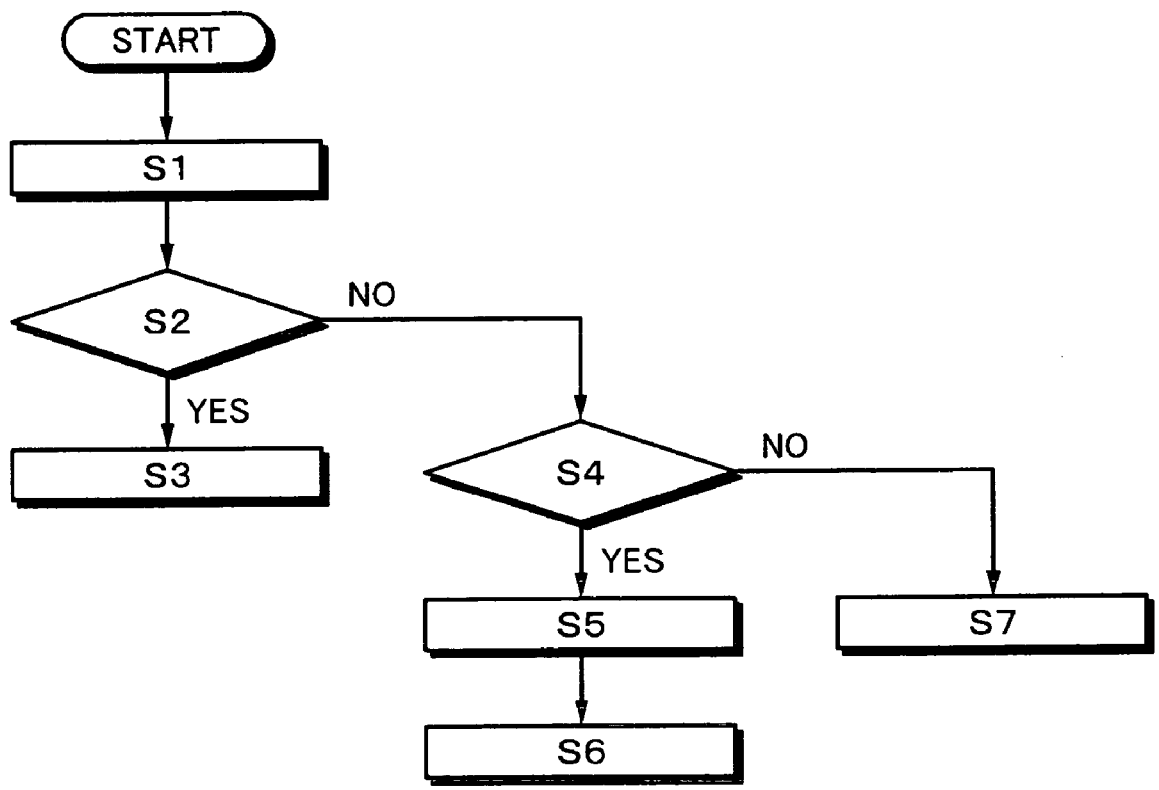
FIG. 3 is a flowchart showing a flow of processes for a type identifying operation in the embodiment of the invention.

FIG. 3 is a flowchart showing a flow for the type discrimination of the optical disc 1 and the control operation of the selector 31. In first step S1, the type ID data of the optical disc 1 is read out. On the basis of the read-out type ID data, whether the optical disc 1 to be reproduced is the type A or not is discriminated in step S2. If it is determined in step S2 that the loaded optical disc 1 is the disc of the type A, the selector 31 selectively outputs the fixed value data from the demultiplexer 24 (step S3). In the example of FIG. 3, an example in which the data of 128 bits of all "1" is used as fixed value data is shown.

If it is determined in step S2 that the loaded optical disc 1 is not the disc of the type A, whether the loaded optical disc 1 is the type B or not is discriminated in step S4. If it is determined in step S4 that the loaded disc is the disc of the type B, step S5 follows and the media key data is read out from the optical disc 1. The read-out media key data is outputted from the selector 31 in step S6. If it is determined in step S4 that the loaded optical disc 1 is not the disc of the type B, a discrimination result showing that the loaded optical disc is none of the discs of the type A and the type B is obtained. In this case, the reproducing operation is stopped or halted and an error process is executed. For example, an error is displayed onto a display unit (not shown) provided for the apparatus shown in FIG. 2 and the loaded optical disc is ejected out of the apparatus (step S7).

In the embodiment of the invention mentioned above, if the fixed value data which is not bound to the optical disc as a media is used, a media in which substantially the same data has been copied can be formed, so that the copyright protection is inadequate. To reduce such influence, in the case of the disc of the type A using the fixed value data, it is desirable to restrict a reproducing environment of the data recorded on the disc, that is, the contents data. For example, in the disc of the type A, ID (identifier) data of the software or hardware is recorded onto the disc, thereby enabling only an apparatus which shares such ID data to reproduce the contents data read out from the optical disc. As an extremal example, it is possible to construct such that only the apparatus which recorded or the software can reproduce the optical disc. In the case of using the media key data, that is, in the case of the disc of the type B, the reproducing environment of the contents data read out from the disc is not limited.

The invention is not limited to the embodiment or the like of the invention mentioned above but many modifications and variations are possible within the scope of the invention without departing from the essence of the invention. For example, an optical disc of the third type other than the discs of the types A and B mentioned can be also used as an optical disc used here. The optical disc of the third type is a disc such that identification information peculiar to the optical disc has been recorded in a read only memory area. The contents data is encrypted while using the hash value obtained by using the identification information is used as key data. The invention can be also applied to a read only type optical disc besides the rewritable type optical disc and the write-once type optical disk. In the case of the read only type, the recording apparatus shown in FIG. 1 is applied to the mastering apparatus. Further, the invention is not limited to the optical disc but can be also applied to another data recording medium, for example, a memory card using a semiconductor memory.

In the invention, at the stage where the novel drive for realizing the full-scale security function using the media key bound to the media is not spread, by realizing the security function which has compatibility with the full-scale security function and uses a fixed value, the novel drive can be smoothly introduced. By discriminating whether the media key has been bound to the media or not on the basis of the type ID, the security function using the media key and the security function using the fixed value can be handled on the same security system, and the compatibility can be easily realized. Further, even in the case of using a fixed value which is not bound to the media, the security can be held by limiting the reproducing environment.

The invention claimed is:

1. A recording apparatus for recording data onto a first type of recording medium or a second type of recording medium, said apparatus comprising:
    an encryption processing unit having a selecting device, a first encrypting device, a hash arithmetic operating unit, and a second encrypting device, in which the selecting device is operable to select one of media key data or fixed value data in accordance with a selection signal which corresponds to an appropriate one of the first type of recording medium and the second type of recording medium, the first encrypting device is operable to receive contents data and to encrypt the received contents data by use of contents key data, the hash arithmetic operating unit is operable to receive application key data and the one of the media key data and the fixed value data which was selected in accordance with the selection signal and to perform a hash arithmetic operation thereon so as to form locker key data, and the second encrypting device is operable to encrypt the contents key data by use of the locker key data, and in which the media key data is bound to the recording medium;
    an encoding processing unit for executing an encoding process on output data from said encryption processing unit; and
    a recording unit for recording output data from said encoding processing unit onto the recording medium, and for recording the media key data onto the recording medium when the media key data is used by the encryption processing unit.

2. The recording apparatus according to claim 1, wherein said second encrypting device is operable to encrypt copyright management data of said contents data together with said contents key data.

3. The recording apparatus according to claim 2, wherein output data from said first encrypting device and output, data from said second encrypting device are supplied to said encoding processing unit.

4. The recording apparatus according to claim 3, wherein said encryption processing unit further comprises a converting circuit unit for converting the application key data, and output data from said converting circuit unit is supplied to said encoding processing unit.

5. The recording apparatus according to claim 1, wherein said recording unit records identification data onto the respective recording medium showing whether data on the respective recording medium has been encryption-processed by using said media key data or said fixed value data.

6. A recording method for recording data onto a first type of recording medium or a second type of recording medium, comprising the steps of:
    selecting one of media key data or fixed value data in accordance with a selection signal which corresponds to an appropriate one of the first type of recording medium and the second type of recording medium, in which the media key data is bound to the recording medium;
    receiving contents data and contents key data;
    encrypting the received contents data by use of the contents key data by a first encrypting device;
    performing a hash arithmetic operation on application key data and the one of the media key data and the fixed value data which was selected in accordance with the selection signal by use of a hash arithmetic operating unit so as to form locker key data;

encrypting the contents key data by use of the locker key data by a second encrypting device;

encoding the encrypted contents data and the encrypted contents key data;

recording the encoded data onto the recording medium; and recording the media key data onto the recording medium when the media key data is selected.

7. The recording method according to claim 6, further comprising encrypting copyright management data of said contents data together with said contents key data by using said locker key data.

8. The recording method according to claim 6, further comprising performing a predetermined converting process on said application key data.

9. The recording method according to claim 6, wherein identification data is recorded onto the respective recording medium showing whether data on the respective recording medium has been encrypted by using one of said media key data and said fixed value data.

10. A reproducing apparatus for reproducing data from a first type of recording medium or from a second type of recording medium, said apparatus comprising:

means for reading out data from the respective recording medium and for providing encrypted contents data and encrypted contents data key therefrom;

means for providing media key data and fixed value data, in which the media key data is bound to the recording medium; and a decryption processing unit having a selecting device, a hash arithmetic operating unit, a first decrypting device, and a second decrypting device, in which the selecting device is operable to select one of the media key data or the fixed value data in accordance with a type signal which corresponds to an appropriate one of the first type of recording medium and the second type of recording medium, the hash arithmetic operating unit is operable to receive application key data and the one of the media key data and the fixed value data which was selected in accordance with the type signal and to perform a hash arithmetic operation thereon so as to form locker key data, the first decrypting device is operable to decrypt the encrypted contents key data by use of the locker key data, and the second decrypting device is operable to receive the encrypted contents data and to decrypt the received encrypted contents data by use of the decrypted contents key data.

11. The reproducing apparatus according to claim 10, wherein identification data is recorded on the respective recording medium showing whether data on the respective recording medium has been encryption-processed by using one of said media key data and said fixed value data, said apparatus further comprises a reading unit for reading said identification data from output data obtained from the respective recording medium, and said selecting device is controlled by output data from said reading unit.

12. A reproducing method for reproducing data from a first type of recording medium or from a second type of recording medium, said method comprising the steps of:

reading out data from the respective recording medium and providing encrypted contents data and encrypted contents data key therefrom;

providing media key data and fixed value data, in which the media key data is bound to the recording medium;

selecting one of the media key data or the fixed value data in accordance with a type signal which corresponds to an appropriate one of the first type of recording medium and the second type of recording medium;

performing a hash arithmetic operation on application key data and the one of the media key data and the fixed value data which was selected in accordance with the type signal by use of a hash arithmetic operating unit so as to form locker key data;

decrypting the encrypted contents key data by use of the locker key data by a first decrypting device; and receiving the encrypted contents data and decrypting the received encrypted contents data by use of the decrypted contents key data by a second decrypting device.

13. The reproducing method according to claim 12, wherein a reproducing process is stopped in a case where the respective recording medium has neither said contents data encrypted by said media key data nor said contents data encrypted by using said fixed value data and recorded.

* * * * *

UNITED STATES PATENT AND TRADEMARK OFFICE
CERTIFICATE OF CORRECTION

| | | |
|---|---|---|
| PATENT NO. | : 7,594,123 B2 | Page 1 of 1 |
| APPLICATION NO. | : 10/380733 | |
| DATED | : September 22, 2009 | |
| INVENTOR(S) | : Yoichiro Sako, Tatsuya Inokuchi and Shunsuke Furukawa | |

It is certified that error appears in the above-identified patent and that said Letters Patent is hereby corrected as shown below:

On the Title Page, Item (30), please insert, --Foreign Application Priority Data   Japan 2001-226242 7/26/2001--

Signed and Sealed this
First Day of March, 2011

David J. Kappos
*Director of the United States Patent and Trademark Office*